United States Patent
Mair et al.

(10) Patent No.: US 10,619,662 B2
(45) Date of Patent: Apr. 14, 2020

(54) SCREW, FASTENING ARRANGEMENT, USE OF A FASTENING ARRANGEMENT, AND METHOD FOR PRODUCING A SCREW

(71) Applicant: SFS intec Holding AG, Heerbrugg (CH)

(72) Inventors: Roland Mair, Gotzis (AT); Marc Comoth, Donzere (FR)

(73) Assignee: SFS intec Holding AG, Heerbrugg (CH)

(*) Notice: Subject to any disclaimer, the term of this patent is extended or adjusted under 35 U.S.C. 154(b) by 581 days.

(21) Appl. No.: 15/411,207

(22) Filed: Jan. 20, 2017

(65) Prior Publication Data

US 2017/0218998 A1  Aug. 3, 2017

(30) Foreign Application Priority Data

Jan. 28, 2016 (DE) ............... 10 2016 101 519

(51) Int. Cl.
| | |
|---|---|
| F16B 35/04 | (2006.01) |
| F16B 25/00 | (2006.01) |
| F16B 39/30 | (2006.01) |
| F16B 25/10 | (2006.01) |
| F16B 5/02 | (2006.01) |

(52) U.S. Cl.
CPC ...... *F16B 25/0052* (2013.01); *F16B 25/0057* (2013.01); *F16B 25/103* (2013.01); *F16B 39/30* (2013.01); *F16B 5/02* (2013.01); *F16B 25/0021* (2013.01)

(58) Field of Classification Search
USPC .................. 411/411, 387.1, 387.2, 387.3
See application file for complete search history.

(56) References Cited

U.S. PATENT DOCUMENTS

| | | | | |
|---|---|---|---|---|
| 3,248,747 | A | | 5/1966 | Scott |
| 3,351,115 | A | * | 11/1967 | Boehlow ............ F16B 25/0047 411/168 |
| 3,498,625 | A | * | 3/1970 | Cherrington ........... A01D 33/00 209/692 |
| 4,477,217 | A | * | 10/1984 | Bonacorsi ........... F16B 25/0031 411/387.4 |

(Continued)

FOREIGN PATENT DOCUMENTS

| | | |
|---|---|---|
| DE | 102009005916 | 7/2010 |
| DE | 102011008167 | 7/2012 |
| WO | 9827345 | 6/1998 |

*Primary Examiner* — Gary W Estremsky
(74) *Attorney, Agent, or Firm* — Volpe and Koenig, P.C.

(57) ABSTRACT

The invention relates to a screw (10) including a head (12), a shaft (14), and a thread (16), with the thread (16) having at least two different thread sections (18, 20), with an external diameter $D_{Gn}$ of a thread section (18) near the head being smaller than an external diameter $D_{Gf}$ of a thread section (20) distant from the head and greater than an external diameter $D_{Sf}$ of the shaft (14) in the area of the thread section (20) distant from the head. According to the invention it is provided that the thread (16) extends up to the bottom of the head (12). The invention further relates to a fastening arrangement (24), the use thereof, and a method.

3 Claims, 3 Drawing Sheets

(56) References Cited

U.S. PATENT DOCUMENTS

| | | | |
|---|---|---|---|
| 4,749,319 A | | 6/1988 | Sygnator |
| 4,749,322 A | * | 6/1988 | Sygnator .................... F16B 5/02 |
| | | | 411/387.3 |
| 5,188,496 A | * | 2/1993 | Giannuzzi ............... F16B 25/00 |
| | | | 411/310 |
| 5,779,417 A | | 7/1998 | Barth et al. |
| 5,800,107 A | * | 9/1998 | Giannuzzi ............... F16B 25/00 |
| | | | 411/386 |
| 6,505,799 B1 | * | 1/2003 | Bercaw ................ A63B 29/025 |
| | | | 248/231.9 |
| 8,348,572 B2 | * | 1/2013 | Friederich ........... F16B 25/0021 |
| | | | 411/387.1 |
| 8,403,972 B2 | * | 3/2013 | Hasenbohler ........ A61B 17/863 |
| | | | 411/411 |
| 2004/0141827 A1 | | 7/2004 | Dicke |
| 2007/0128001 A1 | | 6/2007 | Su |
| 2007/0147973 A1 | * | 6/2007 | Laan ..................... F16B 5/0275 |
| | | | 411/411 |
| 2008/0226424 A1 | * | 9/2008 | Matthiesen ......... F16B 25/0021 |
| | | | 411/411 |
| 2014/0112734 A1 | * | 4/2014 | Ambros ............. F16B 25/0021 |
| | | | 411/387.1 |
| 2015/0204370 A1 | | 7/2015 | Serizawa |

* cited by examiner

SCREW, FASTENING ARRANGEMENT, USE OF A FASTENING ARRANGEMENT, AND METHOD FOR PRODUCING A SCREW

INCORPORATION BY REFERENCE

The following documents are incorporated herein by reference as if fully set forth: German Patent Application No. DE 102016101519.9, filed Jan. 28, 2016.

BACKGROUND

The invention relates to a screw comprising a head, a shaft, and a thread, with the thread comprising at least two different thread sections, with an external diameter $D_{Gn}$ of a thread section near the head being smaller than an external diameter $D_{Gf}$ of a thread section distant from the head and greater than an external diameter $D_{Sf}$ of the shaft in the area of the thread section distant from the head. The invention further relates to a fastening arrangement, the use of a fastening arrangement, as well as a method for producing a screw.

A generic screw is known from EP 0 944 722 B1. The particular feature of this screw is given in that adjacent to a thread-free shaft section a particular progression is provided for the thread between a screw head and a thread. Its characteristic is here that the end section of the thread facing the thread-free shaft section tapers acutely in reference to the axis of the screw. This way it is possible to connect two parts to each other, with the screw at the end of the tightening process being overwound. This way the thread is destroyed in the part in which the end of the thread is located, generating a protection from a reverse rotation of the screw. Although in general the latter can also be achieved in that a screw is used right from the start, with its thread-free shaft section near the head being adjusted in its length to the thickness of the parts. However, the screw of EP 0 944 772 B1 also allows the connection of packages of parts with different thicknesses, because here it is not relevant at which point within the part distanced from the head the end of the thread is located.

The screw of prior art is therefore suitable for numerous applications, namely always when the length of the thread-free shaft section is sufficiently adjusted to the distance of the part distant from the screw head. Here it is not of essential importance at what position within the part distant from the head the end of the thread is located. However at the very moment the screw is overwound the end of the thread shall be located somewhere within the part distant from the head, because only in this way the end of the thread can apply the required counterforce to the holding force of the head in order to ultimately keep the parts securely together. Finally the solution of prior art therefore offers a solution for an expanded range of application for the very same screw. However it is still limited by the above-described requirement, according to which the end of the thread must be located in the part distant from the head. If the latter is successful depends on the length of the thread-free shaft section.

SUMMARY

The object of the invention is to provide a screw, a fastening arrangement, the use of a screw, and a method for producing a screw, that allows the further expansion of the range of application of the screw in reference to prior art and to allow various types of applications of the screw.

This objective is attained by one or more features of the invention. Advantageous embodiments of the invention are described below and in the claims.

The invention is based on the generic screw such that the thread extends up to a bottom of the head. Thus, the screw according to the invention no longer exhibits a thread-free shaft section near the head. Of course, the end of the thread may have a certain distance from the head; the wording that no thread-free shaft section is given and/or that the shaft extends up to the bottom of the head shall here only indicate that no thread-free shaft section of considerable extension is given. If for example the end of the thread has a distance from the head of the screw which is shorter than one thread pitch, it can still be characterized as a thread that extends up to the bottom of the head. In the context with the invention it is only relevant that there is no longer any distinct thread-free section in the proximity of the screw head, with its length amounting to one or more thread pitches. If this screw is used to fasten two parts to each other in a suitable fashion, the thread section near the head engages a part distant from the head at the moment at which the head abuts a part near the head, in any case when the length of the thread section near the head allows this in reference to the thickness of the part near the head. Now there are two different options for concluding the fastening process of the parts in reference to each other. The tightening process of the screw is either concluded at the moment the screw head makes contact. For this purpose for example a torque wrench can be adjusted accordingly. The other option comprises to overwind the screw. In this case the thread section near the head acts like a cutter in the part distant from the head such that not only a secure connection of the two parts is generated in reference to each other, but simultaneously a reversion lock develops. When the screw is overwound, here the thread is destroyed in the part distant from the head such that upon a reverse rotation of the screw no penetration of the screw thread can occur into the part distant from the head. Due to the fact that the thread of the screw extends up to the bottom of the head practically any arbitrarily thin parts near the head can be fastened to parts distant from the head. If the length of the thread section near the head is selected with sufficient length here even thick elements near the head can become a part of the fastening arrangement without having to waive the advantages of the invention. It is preferred that the thread section near the head has a length from 2 to 4 thread pitches.

It is beneficially provided that the thread section near the head and the thread section distant from the head have the same pitch. This feature of the screw is not mandatory to enjoy all or some of the advantages of the present invention. However, the embodiment with a constant pitch represents a very reasonable solution, because it simplifies the production of the screw. It can simply be produced like a conventional screw, in which the thread extends up to the bottom of the head, with then in another production step a cylindrical deformation being performed at the thread section near the head.

It may be provided that the external diameter $D_{Gf}$ of the thread section distant from the head transfers continuously over a certain thread section into the external diameter $D_{Gn}$ of the thread section near the head.

In another variant the screw is embodied such that the external diameter $D_{Gf}$ of the thread section distant from the head transfers in steps to the external diameter $D_{Gn}$ of the thread section near the head.

The invention is particularly beneficial in the context of the screw provided with a drill bit. This way, preferably such parts can be connected to each other in which a part near the head has a pre-drilled hole, while a part distant from the head has no such pre-drilled hole. The screw is then placed through the pre-drilled hole of the part near the head towards the part distant from the head, it drills a hole into the part distant from the head, and then generates a thread in the part distant from the head via the thread section of the screw distant from the head. Towards the end of the tightening process then the thread section near the head enters the part distant from the head. Subsequently, when the head makes contact with the part near the head, either the tightening process can be concluded or the above-described overwinding can occur and thus the protection from reverse rotation can be provided.

The invention further relates to a fastening arrangement with a screw according to the invention and with at least a flat element near the head and a flat element distant from the head, which are connected via the screw.

It is beneficially provided that a thread is inserted into the element distant from the head by the thread section of the screw distant from the head.

According to one variant of the invention the fastening arrangement is embodied such that the two flat elements are held together by a participation of the head and the thread section near the head, with the thread section near the head applying a holding force upon the element distant from the head. This condition of the fastening arrangement is achieved such that the screw is not overwound but the tightening process is stopped when the screw head makes contact with the element or part near the head.

In another variant it may be provided that the two flat elements are held together under the participation of the head and the thread section distant from the head, with the thread section near the head being provided in the element distant from the head in an overwound state.

The invention further relates to the use of a fastening arrangement according to the invention at a façade substructure. The latter is preferably made from aluminum for pre-hung, ventilated façades, with the wall angles and/or wall consoles being fastened at the support profiles which are fixed at the building walls. Here the wall consoles are generally predrilled with 5.5 mm holes, while the support profiles do not have any predrilled holes. Additionally, wall consoles or also support profiles made from different materials may be provided, for example stainless steel. Typical dimensions of the thickness of wall angles and/or wall consoles range from 2 to 4 mm, with preferably those having a thickness of 2 mm being used. Based on the generally available building materials used it is beneficial that the thread section near the head has a length from 3 to 6 mm, the external diameter of the thread should in this section amount to approximately 5 mm, while the external diameter of the thread section distant from the head generally amounts to 5.4 mm.

The advantages of the invention are also discernible in a method for producing a screw according to the invention, with first the screw being produced, with its thread section near the head having the same external diameter as the thread section distant from the head and the screw being finished by deforming the thread section near the head and thus causing a reduction of the external diameter.

BRIEF DESCRIPTION OF THE DRAWINGS

The invention is now explained with reference to the attached drawings based on particularly preferred exemplary embodiments.

DETAILED DESCRIPTION OF THE PREFERRED EMBODIMENTS

Figure 1:
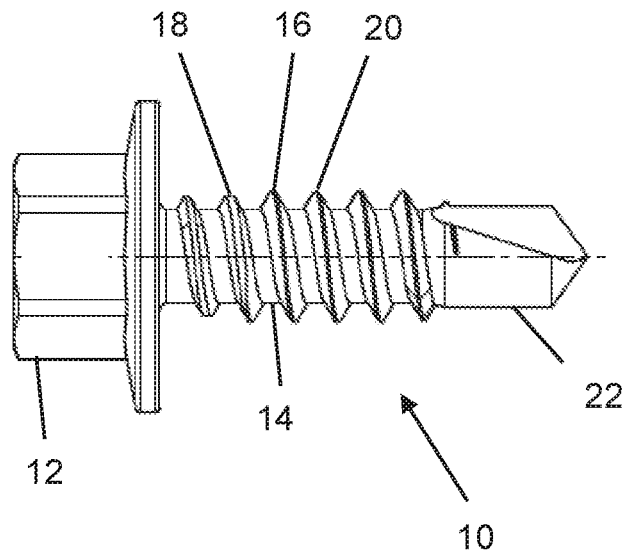
FIG. 1 shows a screw according to the invention.

In the following description of the drawing identical reference characters mark the same or comparable components.

Figure 2:
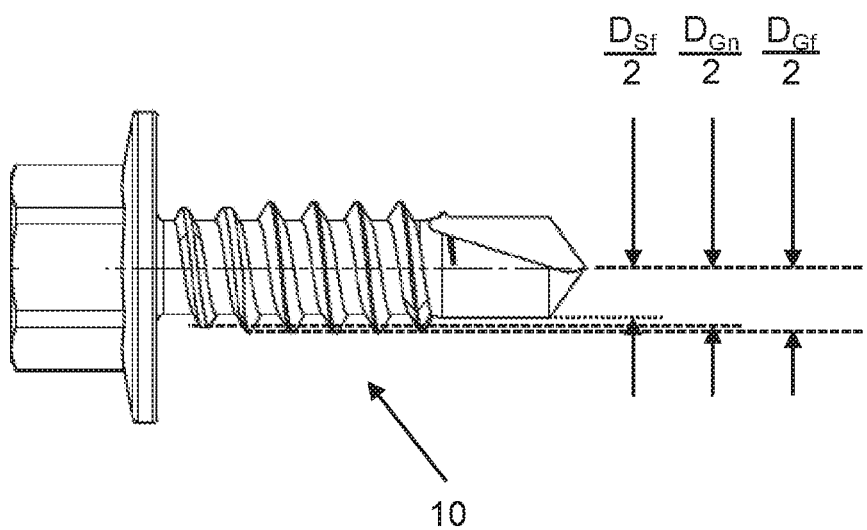
FIG. 2 shows the screw according to the invention according to FIG. 1 for the purpose of defining diameters.
Figure 3:
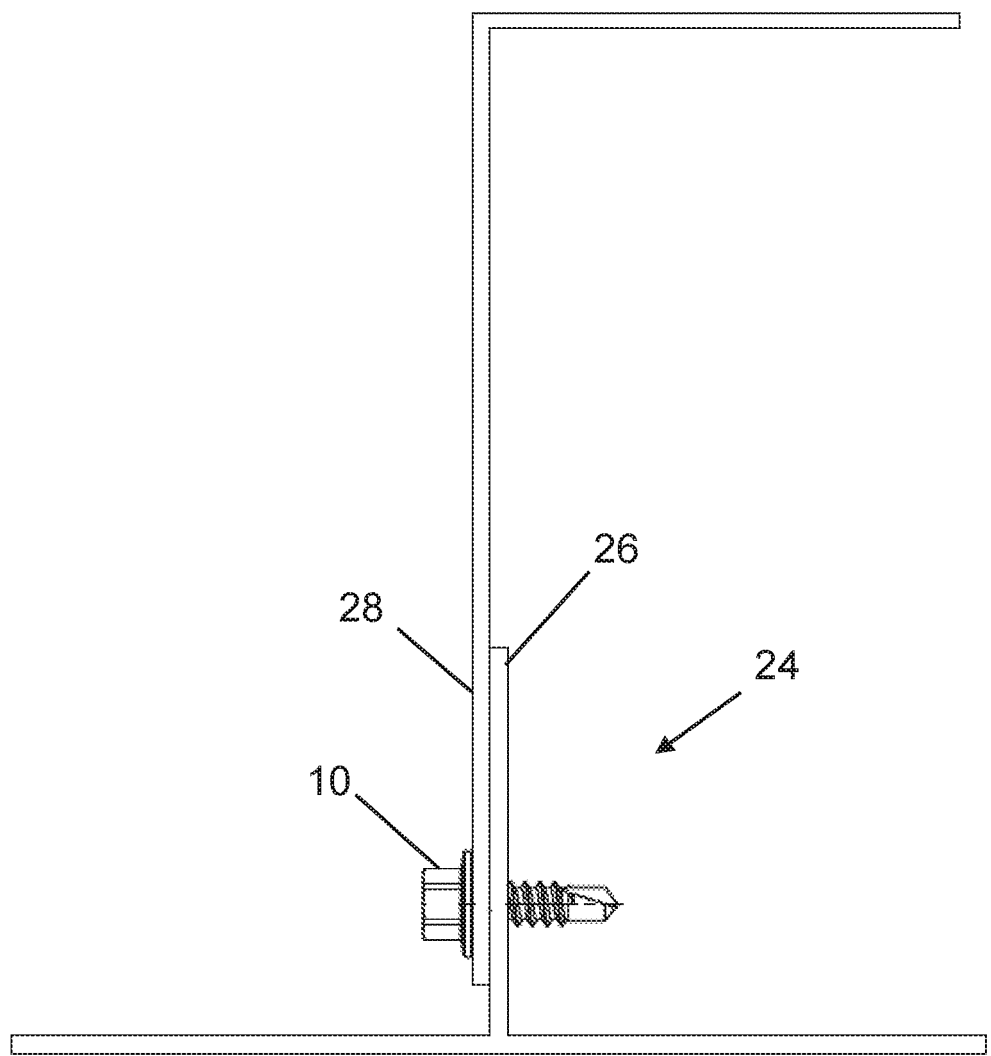
FIG. 3 shows a fastening arrangement according to the invention.

FIG. 1 shows a screw 10 according to the invention. FIG. 2 shows the screw 10 according to the invention based on FIG. 1 for the purpose of defining diameters. FIG. 3 shows the fastening arrangement 24 according to the invention. The screw 10 has a head 12, which provides an engagement force, and a shaft 14. The shaft 14 carries a thread 16 which has a thread section 18 near the head and a thread section 20 distant from the head, with these two thread sections 18, 20 having different external diameters. The external diameters $D_{Gf}$ of the thread section 20 distant from the head is greater than the external diameter $D_{Gn}$ of the thread section 18 near the head. The latter is in turn greater than the external diameter $D_{Sf}$ of the shaft. The present screw is further equipped with a drill bit 22.

For producing a fastening arrangement 24, as shown in FIG. 3, a planar element 28 near the head having a predrilled hole is used, and further a planar element 26 distant from the head without such a predrilled hole. The screw 10 is guided through the predrilled hole of the planar element 28 near the head and it drills with its drill bit a hole into the planar element 26 distant from the head. Subsequently the thread 16 with the thread section 20 distant from the head penetrates into the element 26 distant from the head, causing an internal thread to be generated in the planar element 26 distant from the head. The feed of the screw 10 then occurs until the head 12 of the screw makes contact at the element 28 near the head. At this moment the thread section 18 near the head is already arranged in the planar element 26 distant from the head, of course only in case of an appropriate adjustment of the thickness of the planar element 28 near the head and the length of the threaded section 18 near the head. With the head 12 making contact at the planar element 28 near the head there are now two variants how to complete the fastening arrangement. This is explained in the context with the following FIGS. 4, 5, 6, and 7.

Figure 4:
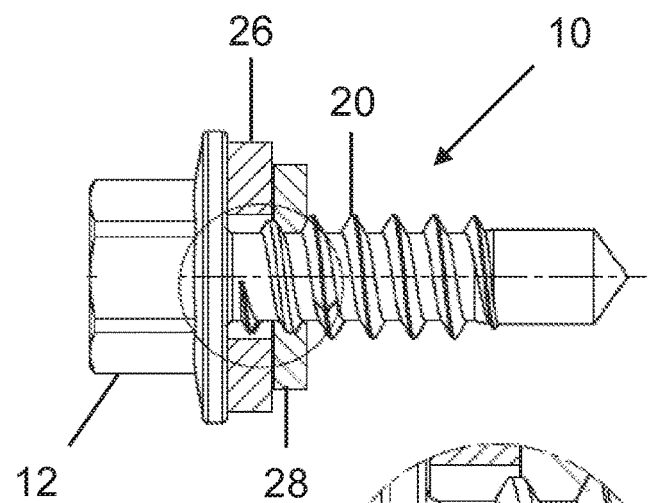
FIG. 4 shows a fastening arrangement according to the invention based on a first variant.
Figure 5:
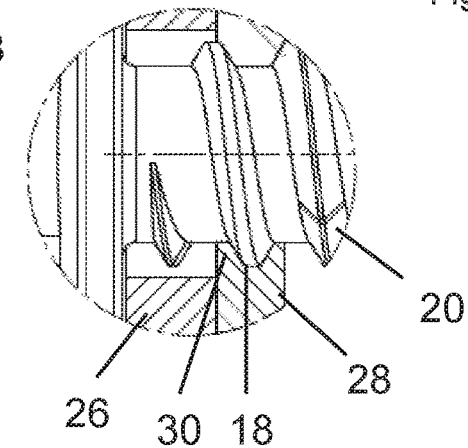
FIG. 5 shows a detail of FIG. 4.
Figure 6:
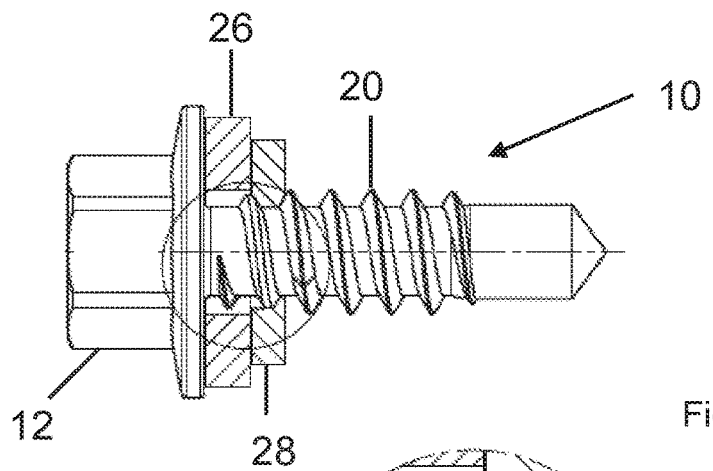
FIG. 6 shows a fastening arrangement according to the invention based on a second variant.
Figure 7:
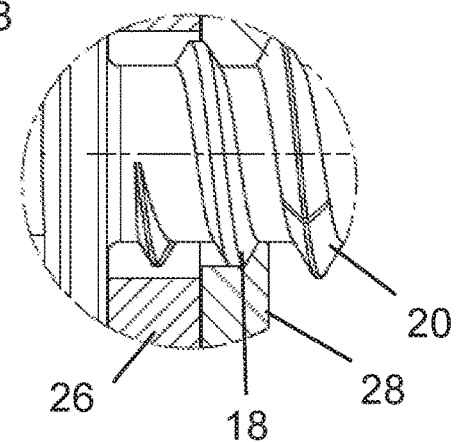
FIG. 7 shows a detail of FIG. 6.

FIG. 4 shows a fastening arrangement according to the invention based on a first variant. FIG. 5 shows a detail of FIG. 4. FIG. 6 shows a fastening arrangement according to the invention based on a second variant. FIG. 7 shows a detail of FIG. 6. FIGS. 4 and 5 illustrate the status reached when the head 12 of the screw 10 has just abutted the element 26 near the head. It is further discernible that the thread section 18 near the head is located in the element 28 distant from the head, with the external thread of the screw engaging the internal thread generated by the screw. The elements 26, 28 are held together by different forces. One of the forces is the force applied by the head 12 upon the element 26 near the head. The counterforce is applied by the threaded section 18 near the head upon the element 28 distant from the head. This is perhaps supported by a force of the threaded section 20 distant from the head, which acts in the same direction. This configuration therefore achieves a tight connection of the screw 10 and the elements 26, 28. However, the screw 10 can be easily wound out of the fastening arrangement, or it may release therefrom by some external influences, because the internal thread in the part 28 distant from the head is completely intact.

The latter is different in the status illustrated in FIGS. 6 and 7. Here the screw 10 was overwound such that the internal thread is destroyed in the element 28 distant from the head. This is discernible from the fact that the material 30 of the element 28 distant from the head present in FIG. 5 is no longer present in FIG. 7. The fastening arrangement is generated in this situation by the holding force of the head 12 as well as the one of the thread section 20 distant from the head. The overwound thread in the area of the thread section near the head no longer contributes to the fastening force or only to a minor extent. However, now a protection from reverse rotation is given because the internal thread in the part 28 near the head is destroyed.

The present invention was explained using the example of two parts to be connected to each other. Of course, an arbitrary number of parts can be connected to each other if the screw is designed appropriately. Here, it is only essential that the thread section near the head in the finished fastening arrangement is located in the part showing the greatest distance from the head of the screw.

The features of the invention disclosed in the above-stated description, the drawings, as well as the claims can be essential for the implementation of the invention either individually as well as in arbitrary combinations.

LIST OF REFERENCE CHARACTERS

10 screw
12 head
14 shaft
16 thread
18 thread section near the head
20 thread section distant from the head
22 drill bit
24 fastening arrangement
26 planar element distant from the head
28 planar element near the head
30 material

The invention claimed is:

1. A fastening arrangement comprising a screw with a head, a shaft, and a thread; the thread comprising at least first and second different thread sections, with an external diameter $D_{Gn}$ of the first thread section that is near the head being smaller than an external diameter $D_{Gf}$ of the second thread section that is distant from the head and being greater than an external diameter $D_{Sf}$ of the shaft in an area of the second thread section that is distant from the head, and the thread extends up to a bottom of the head, at least one flat element near the head, and a flat element distant from the head, which are connected via the screw, wherein the two flat elements are held together by the head and the second thread section that is distant from the head, with the first thread section that is near the head being present in the flat element distant from the head in an overwound state in which a thread formed by the screw in the flat element distant from the head is destroyed.

2. The fastening arrangement according to claim 1, wherein a thread is inserted in the element that is distant from the head by the thread section of the screw distant from the head.

3. The fastening arrangement according to claim 1, wherein the flat elements form a part of a façade substructure.

* * * * *